United States Patent [19]

Mochida et al.

[11] Patent Number: 4,598,054

[45] Date of Patent: Jul. 1, 1986

[54] CERAMIC MATERIAL FOR A HONEYCOMB STRUCTURE

[75] Inventors: Shigeru Mochida, Kasugai; Shunichi Yamada, Nagoya; Toshiyuki Hamanaka, Suzuka, all of Japan

[73] Assignee: NGK Insulators, Ltd., Japan

[21] Appl. No.: 686,144

[22] Filed: Dec. 26, 1984

[30] Foreign Application Priority Data

Dec. 28, 1983 [JP] Japan .................. 58-249788

[51] Int. Cl.⁴ ............................................ C04B 35/04
[52] U.S. Cl. .................... 501/112; 501/119; 501/89; 501/153
[58] Field of Search .............. 501/119, 128, 120, 121, 501/153, 9, 112, 89

[56] References Cited

U.S. PATENT DOCUMENTS

| | | | |
|---|---|---|---|
| 3,531,307 | 9/1970 | Rubin et al. | 501/119 |
| 4,295,892 | 10/1981 | Matsuhisa et al. | 501/119 X |
| 4,304,585 | 12/1981 | Matsuhisa et al. | 65/43 |
| 4,306,909 | 12/1981 | Oda et al. | 501/153 X |
| 4,307,198 | 12/1981 | Oda et al. | 501/119 |
| 4,316,965 | 2/1982 | Oda et al. | 501/119 X |
| 4,357,987 | 11/1982 | Matsuhisa et al. | 165/10 |
| 4,435,512 | 3/1984 | Ito et al. | 501/119 X |

FOREIGN PATENT DOCUMENTS 2261925 9/1973 Fed. Rep. of Germany .......... 501/9
32373 4/1981 Japan .

Primary Examiner—William R. Dixon, Jr.
Assistant Examiner—Karl Group
Attorney, Agent, or Firm—Parkhurst & Oliff

[57] ABSTRACT

A ceramic material for a honeycomb structure is formed from a mixture of raw materials comprising, per 100 parts by weight of the mixture, 20 to 80 parts by weight of cordierite powder and 20 to 80 parts by weight of powder having a crystalline phase consisting mainly of a solid solution of $SiO_2$—$Al_2O_3$—$Fe_2O_3$—$TiO_2$—$MgO$. The mixture consists essentially of 15.7 to 44.0% by weight of $SiO_2$, 29.8 to 41.0% by weight of $Al_2O_3$, 0.9 to 8.3% by weight of $Fe_2O_3$, 7.0 to 35.9% by weight of $TiO_2$ and 4.9 to 16.1% by weight of $MgO$.

4 Claims, 3 Drawing Figures

CERAMIC MATERIAL FOR A HONEYCOMB STRUCTURE

BACKGROUND OF THE INVENTION

1. Field of the Invention

This invention relates to a ceramic material or composition for making a honeycomb structure, such as a device for purifying the exhaust gas of an automobile, a filter for collecting fine particles from the exhaust gas of a diesel engine or a rotary regenerator type ceramic heat exhanger. More particularly, it relates to a ceramic composition which consists mainly of cordierite and a solid solution of $SiO_2$-$Al_2O_3$-$Fe_2O_3$-$TiO_2$-$MgO$, and which is useful for joining or bonding two or more ceramic structures of honeycomb construction together or a ceramic structure of honeycomb construction to another ceramic structure of different construction, or for coating or impregnating a ceramic structure of honeycomb construction to improve its strength and gas tightness.

2. Description of the Prior Art

There is known a ceramic structure of honeycomb construction which is widely used as, for example, a support, a filter or a heat exchanger. There is, for example, known a rotary regenerator type ceramic heat exchanger which comprises a cylindrical matrix of the honeycomb construction having a diameter of 30 cm to 2 m, and a matrix-holding ring fitting on the outer periphery of the cylindrical matrix. This heat exchanger is divided into two halves by a longitudinally extending member defining a heating fluid passage on one side thereof and a heat recovering fluid passage on the other side thereof. One of the halves is heated by a hot fluid and stores or absorbs heat, while the other half releases or transfers heat to a fluid to be heated. As the heat exchanger is rotated, each half thereof is alternately heated and cooled to perform heat exchange.

The rotary regenerator type ceramic heat exchanger as hereinabove described is required to have a high heat exchange efficiency, permit a fluid to flow therethrough smoothly without a substantial drop in pressure, and have a sufficiently high degree of thermal stress resistance to withstand a large temperature gradient. It is also important that the matrix be sufficiently leakproof to maintain a high heat exchange efficiency and thereby a high operating efficiency of the system in which the heat exchanger is employed.

A large rotary regenerator type ceramic heat exchanger has hitherto been produced by a method which is disclosed, for example, in U.S. Pat. Nos. 4,304,585 and 4,357,987 which correspond to Japanese Laid-Open Patent Specification No. 46338/1980. According to this method, a plurality of molded segments for a honeycomb matrix are fired and bonded together by a ceramic binder having substantially the same mineral composition as the matrix segments and differing therefrom only to a very small extent in coefficient of thermal expansion, and the bonded assembly of the segments is fired. When the bonded assembly is fired, however, the degree of thermal contraction of the binder differs from the degree of thermal expansion of the matrix segments. This difference brings about a reduction in the bonding strength of the joints and, as a result, their destruction due to thermal stress. This is particularly a big problem to a centrally supported rotary regenerator type ceramic heat exchanger. It has in its center a ceramic hub having an axial bore in which a rotary supporting shaft is fitted. The hub remains relatively cool, since it is not exposed to a hot fluid, but held in contact with the supporting shaft made of a metal and having good thermal conductivity, while the matrix segments are exposed to the hot fluid. Therefore, the joint between the hub and the matrix segments is not satisfactory in bonding strength.

There are also known LAS (lithium aluminum silicate) and AT (aluminum titanate) as a ceramic binding material for a ceramic heat exchanger. The former is, however, not satisfactory in chemical stability to acids and sodium. Its softening temperature not exceeding 1300° C. also limits the scope of its application. The latter is also unsuitable as a binder, since its exposure to a temperature of about 1100° C. for a long time results in the decomposition of its crystals and an increase in its thermal expansion.

There is hardly any composite material composed of cordierite and LAS, or cordierite and AT, or MAT (magnesium aluminum titanate) and found effective as a binder for a honeycomb structure. Japanese Laid-Open Patent Specification No. 32373/1981 discloses a low thermal expansion type material composed of cordierite and magnesium aluminum titanate. It is, however, merely a material intended for the production of high density porcelain. It is unsuitable as a binder for a ceramic structure of the honeycomb construction, since it still has a high thermal expansion and shrinks heavily upon firing. The material containing AT or MAT is difficult to use at a high temperature, since its aging at a high temperature brings about a change in its crystal structure, which is likely to increase its thermal expansion.

Various methods have been proposed for reducing the leakage of a fluid from a rotary regenerator type ceramic heat exchanger. The leakage can be reduced if the leakage of a fluid through the pores of a partition in a honeycomb matrix or through the layers joining the matrix segments is reduced. The leakage can also be reduced by the provision of a leakproofing coating layer on the outer periphery of the heat exchanger or, if the heat exchanger is in the shape of a ring, on each of its inner and outer peripheries. The use of a highly gastight ceramic binding material enables the layers joining the segments to reduce the fluid leakage. A drastic reduction in leakage can be expected if a highly gastight coating is applied to the outer periphery of the heat exchanger, or if the pores of the partition in the matrix are sealed by a highly gastight material.

The matrix of a honeycomb structure is, however, usually formed of a material having a low coefficient of thermal expansion, such as LAS, cordierite or aluminum titanate. The joining of the matrix segments, the coating of the outer periphery of the matrix and the sealing of the pores of its partition must, therefore, be performed by a material having a low coefficient of thermal expansion which differs only to a small extent from that of the matrix material. No such material has hitherto been discovered.

SUMMARY OF THE INVENTION

Under these circumstances, it is an object of this invention to provide a composite material which comprises cordierite and a solid solution of $SiO_2$-$Al_2O_3$-$Fe_2O_3$-$TiO_2$-$MgO$, and which is particularly suitable for fabricating a ceramic structure of honeycomb construction, such as a rotary regenerator type ceramic heat exchanger, making it leakproof and reinforcing it.

It is another object of this invention to provide a material which has low thermal expansion characteristic and is excellent in heat resistance, mechanical strength, chemical stability and gas tightness, and which is suitable for fabricating a ceramic structure of the honeycomb construction, coating its outer periphery to improve its gas tightness or sealing the pores of a partition in the ceramic structure.

These objects are attained by a ceramic material for a honeycomb strucure, formed of a mixture of raw materials comprising, per 100 parts by weight of the mixture, 20 to 80 parts by weight of cordierite powder and 20 to 80 parts by weight of powder having a crystalline phase consisting mainly of a solid solution of $SiO_2$-$Al_2O_3$-$Fe_2O_3$-$TiO_2$-$MgO$ (hereinafter called FSMAT), the mixture containing 15.7 to 44.0% by weight of $SiO_2$, 29.8 to 41.0% by weight of $Al_2O_3$, 0.9 to 8.3% by weight of $Fe_2O_3$, 7.0 to 35.9% by weight of $TiO_2$ and 4.9 to 16.1% by weight of MgO.

The ceramic material or composition according to of this invention is particularly useful for joining the segments of a rotary regenerator type ceramic heat exchanger, coating it and sealing the pores of a partition defining its honeycomb matrix. It makes it possible to manufacture of rotary regenerator type ceramic heat exchanger having a hub in its center, and which is excellent in the bonding strength of the joints between the segments, thermal stress resistance and leak proofness.

The applicability of the material according to this invention is, however, not limited to a rotary regenerator type ceramic heat exchanger. It is also useful for joining or bonding the segments of a large ceramic filter of honeycomb construction, or for sealing the pores of a partition defining a honeycomb structure for a ceramic heat exchanger of alternative flow and heat transfer type. It is also widely applicable for coating the outer periphery of a ceramic structure of honeycomb construction to improve its leak proofness and strength.

The material of this invention can be used for joining, coating or sealing purposes in a customary fashion, for example, in the form of a paste or slurry prepared by adding an appropriate amount of an appropriate organic binder and/or water to the material.

The material of this invention has a low coefficient of thermal expansion and is excellent in heat resistance, mechanical strength, chemical stability and gas tightness. It is a material of very high industrial utility, as it is widely applicable to ceramic structures of honeycomb construction in general, including a rotary regenerator type ceramic heat exchanger which will hereinafter be taken up by way of example to describe the invention in further detail.

DETAILED DESCRIPTION OF THE INVENTION

Figure 1:
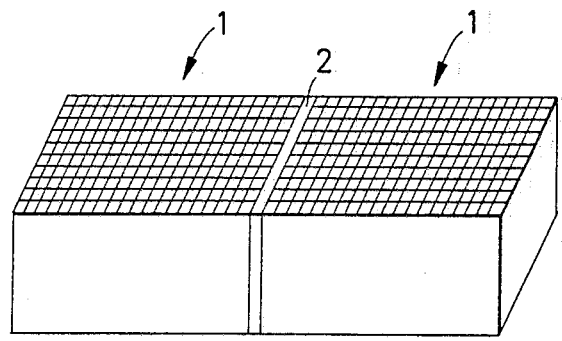
FIG. 1 is a perspective view of a pair of ceramic structures of honeycomb construction joined together by a material embodying this invention.

The material of this invention contains a crystalline phase which consists mainly of cordierite and FSMAT. It contains a small quantity of mullite, spinel, rutile and/or protoenstatite. It is preferable that the quantity of these crystals be as small as practically possible. Their total quantity should generally not exceed 10% by weight.

Cordierite is one of the raw materials forming the material of this invention. It is preferable to employ cordierite of the type which is usually used to form a carrier for a catalyst for purifying the exhaust gas of an automobile. More specifically, it is desirable to use cordierite not containing a large amount of impurities, such as calcia, alkali, potassium or sodium, having a chemical composition in the vicinity of the theoretical chemical composition of cordierite: $2MgO.2Al_2O_3.5SiO_2$ (51.3% $SiO_2$, 34.9% $Al_2O_3$ and 13.8% MgO, by weight), containing at least 90% by weight of cordierite crystals and having a low coefficient of thermal expansion. The use of cordierite powder containing a large amount of mullite or spinel crystals should be avoided, since they increase the thermal expansion of the material.

Another raw material used to prepare the material of this invention is FSMAT powder. It is possible to use, for example, FSMAT powder of the type disclosed in U.S. Pat. No. 4,316,965 which corresponds to Japanese Laid-Open Patent Specification No. 140073/1981. As far as a mixture of cordierite and FSMAT is concerned, it is preferable to use a material containing 1.0 to 20.0% by weight of $SiO_2$, 22.0 to 50.0% by weight of $Al_2O_3$, 1.0 to 20.0% by weight of $Fe_2O_3$, 19.0 to 59.5% by weight of $TiO_2$ and 1.2 to 20.0% by weight of MgO, so that less crystallization of mullite, rutile, spinel, etc. may take place.

The powder of FSMAT is usually prepared from a mixture of raw materials selected from magnesia, magnesium carbonate, magnesium hydroxide, talc, alumina, aluminum hydroxide, bauxite, anatase type titanium oxide, rutile type titanium oxide, metallic iron, $\alpha$-ferric oxide, $\gamma$-ferric oxide, iron oxide hydrate, ilmenite, clay, calcined clay, glost-fired clay, silica sand, pyrophyllite, mullite, sillimanite, kaolinite, etc. The raw materials are selected and mixed to give the chemical composition hereinabove set forth. The mixture is formed into a plastically deformable batch after a molding agent has been added, if required. The plasticized batch is molded into a desired shape by a ceramic molding method, such as extrusion molding, press forming, slip casting or injection molding, and the molded product is dried. The dried material or the simple mixture of the raw materials is heated at a temperature-raising rate of 5° C. to 300° C. per hour and fired at a temperature of 1300° C. to 1700° C. for a predetermined period, preferably 0.5 to 10 hours. The fired material is crushed in a dry or wet pot mill or pin mill, whereby the powder of FSMAT is obtained.

FSMAT is an improvement over MAT crystals having a low coefficient of thermal expansion and high heat resistance. It contains a solid-solubilized $Fe_2O_3$ which improves its stability at a high temperature for a long time, and a solid-solubilized $SiO_2$ in order to improve the strength of the sintered material. The addition of $SiO_2$ improves the bonding strength between the material of this invention and a ceramic structure of the honeycomb construction to which it is applied. The thermal expansion characteristics of FSMAT are reflected in the material of this invention. If FSMAT having a low coefficient of thermal expansion is used, the material of this invention has a correcpondingly low coefficient of thermal expansion. It is, therefore, advisable to use FSMAT having as low a coefficient of thermal expansion as possible.

The raw materials used for the material of this invention may further contain SiC powder as a flux. The addition of the powder of SiC is effective for lowering the firing temperature to some extent and improving the wetting property of the material of this invention relative to a ceramic structure of honeycomb construction to form a strong bond therebetween, without exerting any adverse effect on the thermal expansion characteristics of the material, its stability during aging at a high temperature and its chemical stability. There is no particular limitation to the crystal form of SiC powder or the method of its production if it is composed of fine particles and does not contain a large amount of impurities.

An appropriate organic binder, such as methyl cellulose, CMC or PVA, and/or water may be added to the material of this invention to form a paste or slurry thereof. The paste or slurry is applied to a ceramic structure of honeycomb construction, and the bonded assembly is fired. It is fired at a temperature of 1300° C. to 1450° C. A preferred firing temperature is in the range of 1350° C. to 1440° C. The firing temperature dictates the heat resistance of the material. The composition of the raw materials may be selected so as to manufacture a product having desired heat resistance. If the firing conditions, such as holding time, are changed, it is possible to employ different firing temperatures for different products which are manufactured from the raw materials of the same composition.

The material of this invention is most preferably applicable to a ceramic honeycomb structure formed of cordierite, in view of its thermal expansion level. It is, however, also applicable to a honeycomb structure formed from, for example, mullite, alumina, LAS, aluminum titanate or silicate, or $SiO_2$-$Al_2O_3$-$Fe_2O_3$-$TiO_2$-$MgO$.

The proportions of the raw materials forming the material of this invention and the chemical composition thereof have certain limitations found necessary by the inventors of this invention as a result of their systematic and extensive experiments or tests. These limitations have been set for the reasons which will hereinafter be set forth.

(1) Proportions of the Raw Materials

If the mixture of cordierite and FSMAT powders contains more than 80 parts by weight of cordierite and less than 20 parts by weight of FSMAT per 100 parts by weight of the mixture, the resulting material has a low bonding strength relative to a ceramic structure of honeycomb construction to which it is applied. If it contains less than 20 parts by weight of cordierite and more than 80 parts by weight of FSMAT, the reaction between the material and the ceramic structure of honeycomb construction brings about a number of problems including its melting. According to this invention, therefore, it is necessary to use 20 to 80 parts by weight of cordierite powder and 20 to 80 parts by weight of FSMAT powder so that they may make a total of 100 parts by weight.

(2) Chemical Composition

In addition to the limitations on the proportions of the raw materials, this invention has certain limitations on the chemical composition thereof as will hereinafter be described.

If the mixture of the raw materials contains less than 15.7% by weight of $SiO_2$, more than 41.0% by weight of $Al_2O_3$ or more than 16.1% by weight of MgO, the resulting material has a low bonding strength relative to a ceramic structure of honeycomb construction to which it is applied. The presence of more than 44.0% by weight of $SiO_2$, less than 29.8% by weight of $Al_2O_3$, or less than 4.9% by weight of MgO results in a radical reaction between the material and the ceramic structure of honeycomb construction to which it is applied. According to this invention, therefore, it is necessary to control the quantity of $SiO_2$ within 15.7 to 44.0% by weight, $Al_2O_3$ within 29.8 to 41.0% by weight and MgO within 4.9 to 16.1% by weight.

If the mixture of the raw materials contains less than 0.9% by weight of $Fe_2O_3$, the aging of the material at a high temperature results in the decomposition of FSMAT crystals which increases its thermal expansion. The presence of more than 8.3% by weight of $Fe_2O_3$ results in a reaction between the material and a ceramic structure of honeycomb construction and thereby its melting, and also brings about a number of problems, such as an increase in thermal expansion. Therefore, it is necessary to ensure that the quantity of $Fe_2O_3$ be in the range of 0.9 to 8.3% by weight.

If the quantity of $TiO_2$ is less than 7.0% by weight, the resulting material has a low bonding strength relative to the ceramic structure of honeycomb construction to which it is applied. If it is more than 35.9% by weight, the resulting material reacts excessively with the ceramic structure to which it is applied. In either event, the material has a high coefficient of thermal expansion. Therefore, it is necessary to ensure that the quantity of $TiO_2$ be in the range of 7.0 to 35.9% by weight.

(3) Chemical Composition of FSMAT

The FSMAT used in accordance with this invention has a suitable chemical composition which depends on the chemical composition of its raw materials. It has a chemical composition which is desirable for the material of this invention. According to this invention, it is preferable to use FSMAT containing 1.0 to 20.0% by weight of $SiO_2$, 22.0 to 50.0% by weight of $Al_2O_3$, 1.0 to 20.0% by weight of $Fe_2O_3$, 19.0 to 59.5% by weight of $TiO_2$ and 1.2 to 20.0% by weight of MgO. If it contains more than 20 % by weight of $SiO_2$, more than 50.0% by weight of $Al_2O_3$ or more than 20.0% by weight of MgO, the heavy crystallization of mullite, spinel, etc. results in a high coefficient of thermal expansion. If it contains less than 1.0% by weight of $SiO_2$ or less than 1.2% by weight of MgO, the resulting material has a low bonding strength relative to a ceramic structure of honeycomb construction to which it is applied. If it contains less than 22.0% by weight of $Al_2O_3$ or more than 59.5% by weight of $TiO_2$, the heavy reaction between the resulting material and the ceramic structure to which it is applied brings about a number of problems, such as melting.

If FSMAT contains more than 20.0% by weight of $Fe_2O_3$ or less than 19.0% by weight of $TiO_2$, it has a high thermal expansion. If it contains less than 1.0% by weight of $Fe_2O_3$, the decomposition of FSMAT crystals at a high aging temperature brings about a number of problems including an increase in its thermal expansion.

(4) Addition of SiC

The raw materials forming the material of this invention may contain SiC, if required, for the reasons as hereinbefore stated. The quantity of SiC which can be added has its own limitation. If it exceeds 5 parts by weight per 100 parts by weight of the mixture of cordierite and FSMAT powders, the reaction between the resulting material and a ceramic structure to which it is applied gives rise to a number of problems such as melting and a drastic increase in thermal expansion. Therefore, it is necessary to ensure that the quantity of SiC not exceed 5 parts by weight per 100 parts by weight of the mixture of cordierite and FSMAT powders.

The invention will now be described more specifically with reference to several examples thereof which are, of course, not intended for limiting the scope of this invention. In the examples, all percentages and parts will be shown by weight unless otherwise noted.

TABLE 1 shows the chemical composition of each of the cordierite and FSMAT powders employed in the following examples.

TABLE 1

|  | Cordierite powder | FSMAT powder |
| --- | --- | --- |
| Particle size (μm) | −44 | −44 |
| Chemical composition (%) | | |
| $SiO_2$ | 50.0 | 10.0 |
| $Al_2O_3$ | 35.0 | 39.5 |
| $Fe_2O_3$ | 0.5 | 2.5 |
| $TiO_2$ | 0.5 | 44.5 |
| MgO | 13.5 | 3.0 |

EXAMPLE 1

A variety of ceramic binding materials (binders) for joining the segments of a cordierite structure of honeycomb construction were prepared by mixing the cordierite and FSMAT powders of TABLE 1 and a commercially available SiC powder having a grain size of −74 μm in the proportions shown in TABLE 2 and adding methyl cellulose and water to each mixture to form a paste thereof.

The segments to be joined were prepared by extrusion molding a known cordierite composition into a honeycomb structure having square cells and a partition thickness of 0.15 mm, and firing it at a maximum temperature of 1400° C. for six hours. The segments were 70 mm square by 50 mm high, and had a thermal expansion coefficient of 0.057% at 800° C.

Each ceramic binding material was applied in a layer having a thickness of about 3 mm to the machined end surfaces of a pair of segments, which are shown at 1 in FIG. 1. In FIG. 1, the layer of the binder is shown at 2. The bonded assembly of the segments was fully dried at 100° C. and fired for an hour in an electric furnace at the maximum temperature shown in TABLE 2.

Figure 2:
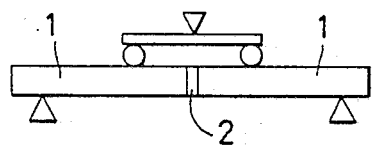
FIG. 2 is a schematic view showing a method of testing the strength of a joint between a pair of ceramic matrix segments of honeycomb construction by bending the joined assembly with a four-point bending method.

The honeycomb structures made as hereinabove set forth were visually inspected for appearance and tested for strength by a four-point bending method; two spaced-apart points on each side of the joint 2 as shown in FIG. 2. A 5 mm square, 50 mm long testpiece was prepared from each binding material and its coefficient of thermal expansion was examined by firing at the firing temperature employed for joining the segments. The results of evaluation of the joints and the thermal expansion coefficient of each binding material at temperature of 40° C. to 800° C. are shown in TABLE 2.

The chemical composition of the raw materials shown in TABLE 2 does not include SiC. Alphabetic letters appearing in TABLE 2 to indicate the quality of the joint of each honeycomb structure have the following meanings:

A: Good appearance and high bonding strength (broken first at the honeycomb segments);

B: Good appearance and low bonding strength (broken first at the joint);

C: Bad appearance and high bonding strength (broken first at the segments); and

D: Bad appearance and low bonding strength (broken first at the joint).

As is obvious from TABLE 2, all of the ceramic binding materials prepared from materials Nos. 1 to 11 according to this invention showed a high bonding strength, and gave a good appearance at the joint 2 between the segments 1. Comparative materials Nos. 12 to 14 failed to satisfy the limitations of this invention in the proportions of cordierite, FSMAT or SiC powder. All of the binding materials prepared therefrom failed to provide a satisfactory joint between the segments.

When materials Nos. 1 to 11 according to this invention were aged at 1100° C. for 500 hours, all of them were substantially free from any change in dimensions, thermal expansion coefficient and mineral composition.

TABLE 2

| No. | Composition of the material (parts) | | | Chemical composition (%) | | | | | Firing temp. (°C.) | Coefficient of thermal expansion ($10^{-6}$/°C.) | Quality of joint |
| --- | --- | --- | --- | --- | --- | --- | --- | --- | --- | --- | --- |
|  | Cordierite | FSMAT | SiC | $SiO_2$ | $Al_2O_3$ | $Fe_2O_3$ | $TiO_2$ | MgO |  |  |  |
| Invention | | | | | | | | | | | |
| 1 | 80 | 20 | — | 42.0 | 35.9 | 0.9 | 9.3 | 11.4 | 1440 | 1.6 | A |
| 2 | 70 | 30 | — | 38.0 | 36.4 | 1.1 | 13.7 | 10.4 | 1430 | 1.2 | A |
| 3 | 60 | 40 | — | 34.0 | 36.8 | 1.3 | 18.1 | 9.3 | 1420 | 0.8 | A |
| 4 | 60 | 40 | 1 | 34.0 | 36.8 | 1.3 | 18.1 | 9.3 | 1410 | 0.9 | A |
| 5 | 60 | 40 | 2 | 34.0 | 36.8 | 1.3 | 18.1 | 9.3 | 1400 | 1.2 | A |
| 6 | 60 | 40 | 5 | 34.0 | 36.8 | 1.3 | 18.1 | 9.3 | 1370 | 1.6 | A |
| 7 | 50 | 50 | — | 30.0 | 37.3 | 1.5 | 22.5 | 8.3 | 1400 | 0.8 | A |
| 8 | 50 | 50 | 5 | 30.0 | 37.3 | 1.5 | 22.5 | 8.3 | 1350 | 1.5 | A |
| 9 | 40 | 60 | — | 26.0 | 37.7 | 1.7 | 26.9 | 7.2 | 1390 | 0.9 | A |
| 10 | 30 | 70 | — | 22.0 | 38.2 | 1.9 | 31.3 | 6.2 | 1380 | 0.9 | A |
| 11 | 20 | 80 | — | 18.0 | 38.6 | 2.1 | 35.7 | 5.1 | 1360 | 1.0 | A |
| Comparative | | | | | | | | | | | |
| 12 | 60 | 40 | 6 | 34.0 | 36.8 | 1.3 | 18.1 | 9.3 | 1360 | 1.8 | C |
| 13 | 85 | 15 | — | 44.0 | 35.7 | 0.8 | 7.1 | 11.9 | 1440 | 1.7 | B |

TABLE 2-continued

| No. | Composition of the material (parts) | | | Chemical composition (%) | | | | | Firing temp. (°C.) | Coefficient of thermal expansion ($10^{-6}$/°C.) | Quality of joint |
|---|---|---|---|---|---|---|---|---|---|---|---|
| | Cordierite | FSM AT | SiC | $SiO_2$ | $Al_2O_3$ | $Fe_2O_3$ | $TiO_2$ | MgO | | | |
| 14 | 15 | 85 | — | 16.0 | 38.8 | 2.2 | 37.9 | 4.6 | 1350 | 1.0 | C |

EXAMPLE 2

A variety of binding materials for joining the segments of a cordierite honeycomb structure were prepared by mixing in the proportions shown in TABLE 3 the cordierite powder of TABLE 1 and various FSMAT powders of different chemical compositions shown in TABLE 3, and adding methyl cellulose and water to each mixture to form a paste thereof.

Each binder was tested for joining the cordierite segments of EXAMPLE 1 in accordance with the prodceures of EXAMPLE 1. The thermal expansion coefficient of each binder was examined at a temperature of 40° C. to 800° C. The results of evaluation of the joint formed by each binder and its coefficient of thermal expansion are shown in TABLE 3. Alphabetic letters appearing in TABLE 3 to indicate the quality of the joint have the same meanings as those used in EXAMPLE 1.

As is obvious from TABLE 3, all of the binders prepared from materials Nos. 21 to 30 according to this invention showed a high bonding strength. On the other hand, all of comparative binder materials Nos. 31 and 32, which failed to satisfy the limitations of this invention in the proportions of the raw materials, and comparative binder materials Nos. 33 to 37, which failed to satisfy the limitations of this invention in the overall chemical compostition, failed to provide a satisfactory joint and had a high coefficient of thermal expansion.

a maximum temperature of 1400° C. for six hours and machined into sectoral shapes defining a unitary or monolithic rotary regenerator type heat exchanger.

Methyl cellulose and water were added to material No. 5 according to EXAMPLE 1 of this invention to prepare a binder in the form of a paste. The paste was applied to the sectorally shaped matrix segments and hub to form a layer having a thickness of about 2 mm and they were joind to form a unitary heat exchanger. A paste was also prepared from material No. 3 of EXAMPLE 1 and applied to the outer periphery of the bonded assembly to form a coating having a thickness of about 3 mm thereon. The assembly was, then, dried and fired at a maximum temperature of 1390° C. for an hour to provide a rotary regenerator type heat exchanger formed from cordierite, provided with a hub at its center and having a diameter of 450 mm and a thickness of 80 mm.

For comparative purposes, a heat exchanger of the same shape was prepared by employing the cordierite material of the matrix segments as a binder and an outer peripheral coating material.

The two heat exchangers were compared for properties. The results are shown in TABLE 4. As is obvious from TABLE 4, the heat exchanger made by employing the material of this invention as a binder and a coating material had a highly reliable joint between every two adjoining matrix segments and between each matrix segment and the hub. Samples were cut so as to include

TABLE 3

| No. | | Invention | | | | | | | | | | Comparative | | | | | | |
|---|---|---|---|---|---|---|---|---|---|---|---|---|---|---|---|---|---|---|
| | | 21 | 22 | 23 | 24 | 25 | 26 | 27 | 28 | 29 | 30 | 31 | 32 | 33 | 34 | 35 | 36 | 37 |
| Composition of the material (parts) | Cordierite | 80 | 30 | 60 | 60 | 60 | 20 | 40 | 65 | 60 | 30 | 85 | 15 | 20 | 40 | 40 | 60 | 40 |
| | FSMAT (−74 μm) | 20 | 70 | 40 | 40 | 40 | 80 | 60 | 35 | 40 | 70 | 15 | 85 | 80 | 60 | 60 | 40 | 60 |
| Chemical composition of FSMAT (%) | $SiO_2$ | 20.0 | 1.0 | 3.0 | 14.0 | 5.0 | 14.0 | 2.8 | 18.0 | 4.0 | 10.0 | 1.5 | 13.0 | 7.0 | 14.0 | 5.3 | 18.0 | 5.0 |
| | $Al_2O_3$ | 34.0 | 39.5 | 50.0 | 22.0 | 34.0 | 38.5 | 34.2 | 41.5 | 35.0 | 39.5 | 45.5 | 35.0 | 40.5 | 26.0 | 37.5 | 46.5 | 35.0 |
| | $Fe_2O_3$ | 4.0 | 6.0 | 2.0 | 13.0 | 20.0 | 1.0 | 1.5 | 15.0 | 2.0 | 4.3 | 4.0 | 6.5 | 4.0 | 4.0 | 13.7 | 10.0 | 3.0 |
| | $TiO_2$ | 37.5 | 44.5 | 42.0 | 41.0 | 37.5 | 40.0 | 59.5 | 19.0 | 38.5 | 44.5 | 46.5 | 37.0 | 44.5 | 50.0 | 40.0 | 16.5 | 38.5 |
| | MgO | 4.0 | 8.5 | 2.5 | 9.5 | 3.0 | 6.0 | 1.5 | 6.0 | 20.0 | 1.2 | 2.0 | 8.0 | 3.5 | 5.5 | 3.0 | 8.5 | 18.0 |
| Chemical composition of the material (%) | $SiO_2$ | 44.0 | 15.7 | 31.2 | 35.6 | 32.0 | 21.2 | 21.7 | 38.8 | 31.6 | 22.0 | 42.7 | 18.6 | 15.6 | 28.4 | 23.2 | 37.2 | 23.0 |
| | $Al_2O_3$ | 34.8 | 38.2 | 41.0 | 29.8 | 34.6 | 37.8 | 34.5 | 37.3 | 35.0 | 38.2 | 36.6 | 35.0 | 39.4 | 29.6 | 36.5 | 39.6 | 35.0 |
| | $Fe_2O_3$ | 1.2 | 4.4 | 1.1 | 5.5 | 8.3 | 0.9 | 1.1 | 5.6 | 1.1 | 3.2 | 1.0 | 5.6 | 3.3 | 2.6 | 8.4 | 4.3 | 2.0 |
| | $TiO_2$ | 7.9 | 31.3 | 17.1 | 16.7 | 15.3 | 32.1 | 35.9 | 7.0 | 15.7 | 31.3 | 7.4 | 31.5 | 35.7 | 30.2 | 24.2 | 6.9 | 23.3 |
| | MgO | 11.6 | 10.0 | 9.1 | 11.9 | 9.3 | 7.5 | 6.3 | 10.9 | 16.1 | 4.9 | 11.8 | 8.8 | 5.5 | 8.7 | 7.2 | 11.5 | 16.2 |
| Firing temp. (°C.) | | 1440 | 1400 | 1420 | 1370 | 1400 | 1380 | 1350 | 1390 | 1420 | 1400 | 1440 | 1350 | 1370 | 1390 | 1400 | 1360 | 1420 |
| Coefficient of thermal expansion ($\times 10^{-6}$/°C.) | | 1.6 | 1.2 | 1.6 | 1.4 | 1.6 | 1.3 | 1.5 | 1.6 | 1.6 | 1.5 | 1.6 | 1.1 | 1.4 | 1.6 | 1.8 | 1.9 | 1.8 |
| Quality of joint | | A | A | A | A | A | A | A | A | A | A | B | C | B | C | C | B | B |

EXAMPLE 3

Figure 3:
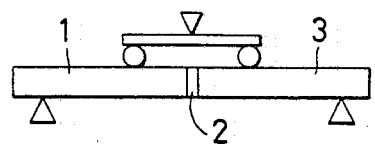
FIG. 3 is a view similar to FIG. 2, but showing a method of testing the strength of a joint between a ceramic matrix segment of honeycomb construction and a hub.

A plurality of segments for a honeycomb matrix having a partition thickness of 0.12 mm and a triangular cell section and measuring 130 mm by 180 mm by 80 mm (high) were molded from the cordierite material of EXAMPLE 1 by the method employed in EXAMPLE 1. The same cordierite material was also used for the press forming of a hub having a relatively large thickness. Thirteen matrix segments and a hub were fired at those joints and tested for strength by a four-point bending method, as shown in FIGS. 2 and 3. No fracture occurred on the joint 2, but all of the fractures occurred to the segments of lower strength. In FIGS. 2 and 3, the matrix segments are shown at 1, and the hub at 3.

The heat exchanger was placed in an electric furnace having a temperature of 700° C. and taken out therefrom after a certain period of time for evaluation in its thermal stress resistance. No crack was found in the joints. It was also examined for leakage at a pressure of 1.4 kg/cm². The heat exchanger made by employing the material of this invention was by far superior in leak proofness to the comparative heat exchanger. The leak tests were conducted in accordance with the method described in page 213 of DOE/NASA/0008-12, NASA, CR-165139 "Ceramic Regenerator Systems Development Program - Final Report".

material in the form of a paste was prepared from material No. 4 of EXAMPLE 1 and applied to the outer periphery of the bonded assembly to form a coating having a thickness of about 3 mm thereon. Two heat exchangers were, thus, prepared. Each of them was fully dried and fired at a maximum temperature of 1410° C. for an hour to provide a rotary regenerator type heat exchanger formed of cordierite, and having a diameter of 700 mm and a thickness of 80 mm.

TABLE 4

|  |  | Invention | Comparative |
|---|---|---|---|
| Ceramic binding material | | No. 5 (Example 1) | Of the same cordierite composition as the matrix |
| Outer peripheral coating material | | No. 3 (Example 1) | Of the same cordierite composition as the matrix |
| Firing temp. for binding and coating | | 1420° C. × 1 Hr | 1400° C. × 6 Hr |
| Results of four-point bending strength test | Joint between matrixes | Broken at matrixes | Broken at joint |
| | Joint between matrix and hub | Broken at matrixes | Broken at joint |
| Thermal stress resistance (sample discharged from an electric furnace at 700° C. and checked for cracking) | | No crack | Crack in joint |
| Leakage at a pressure of 1.4 kg/cm² kg/sec · m²) | | 0.020 | 0.029 |

EXAMPLE 4

The matrix segments of EXAMPLE 3 having a partition thickness of 0.12 mm and a triangular cell section and measuring 130 mm by 180 mm by 80 mm (high) were immersed in a slurry containing material No. 7 according to EXAMPLE 1 of this invention and 60% of water. After any excess of the slurry had been removed from the segments, they were dried. These procedures were repeated until the segments came to carry about 15% of the material No. 7 on the average.

The outer peripheral and end surfaces of 35 such matrix segments were machined into shapes defining a unitary or monolithic rotary regenerator type heat exchanger. Methyl cellulose and water were added to material No. 5 according to EXAMPLE 1 of this invention to prepare a binder in the form of a paste. The binder was applied to the end surfaces of the matrix segments in a layer having a thickness of about 2 mm and the segments were bonded together. A coating material in the form of a paste was prepared from material No. 4 of EXAMPLE 1 and applied to the outer periphery of the bonded assembly to form a coating having a thickness of about 3 mm thereon. Two heat exchangers were, thus, prepared. Each of them was fully dried and fired at a maximum temperature of 1410° C. for an hour to provide a rotary regenerator type heat exchanger formed of cordierite, and having a diameter of 700 mm and a thickness of 80 mm.

Another rotary regenerator type heat exchanger was formed of cordierite by employing the binder prepared from material No. 5 and the coating material prepared from material No. 4, but the matrix segments were not impregnated with material No. 7 of EXAMPLE 1. For the sake of further comparison, a heat exchanger of the same shape was prepared from the cordierite material of the matrix segments as a binder and an outer peripheral coating material.

These three kinds of heat exchangers were evaluated in properties. The results are shown in TABLE 5. As is obvious from TABLE 5, the heat exchangers having a matrix carrying the material of this invention showed a particularly great reduction in leakage, maintained a highly reliable bonding strength and remained excellent in thermal stress resistance without having any appreciable increase in the thermal expansion coefficient of its matrix, as opposed to the other heat exchangers.

TABLE 5

|  | Invention | | Comparative |
|---|---|---|---|
| Ceramic binding material | No. 5 (Example 1) | No. 5 (Example 1) | Same cordierite composition as the matrix |
| Outer peripheral coating material | No. 4 (Example 1) | No. 4 (Example 1) | Same cordierite composition as the matrix |
| Matrix support | No. 7 (Example 1) | None | None |
| Firing temp. for binding, coating and matrix pore sealing | 1410° C. × 1 Hr | 1410° C. × 1 Hr | 1400° C. × 6 Hr |
| Coefficient of thermal expansion of joint portion ($\times 10^{-6}/°C.$) | 0.9 | 0.7 | 0.7 |
| Coefficient of thermal expansion of joint portion ($\times 10^{-6}/°C.$) | 1.0 | 1.0 | 1.2 |
| Thermal stress resistance (sample discharged from an electric furnace at 650° C. and checked for cracking) | No crack | No crack | crack |
| Leakage at a pressure of 1.4 kg/cm² | 0.014 | 0.021 | 0.029 |

TABLE 5-continued

| Invention | Comparative |
|---|---|
| kg/sec · m$^2$) | |

What is claimed is:

1. A ceramic material for joining, coating or sealing a honeycomb structure comprising, per 100 parts by weight, a first mixture of 20 to 80 parts by weight of cordierite powder and 20 to 80 parts by weight of a ceramic powder having a crystalline phase consisting essentially of a solid solution of SiO$_2$ - Al$_2$O$_3$ - Fe$_2$O$_3$ - TiO$_2$ - MgO, said first mixture having a chemical composition consisting essentially of 15.7 to 44.0% by weight of SiO$_2$, 29.8 to 41.0% by weight of Al$_2$O$_3$, 0.9 to 8.3% by weight of Fe$_2$O$_3$, 7.0 to 35.9% by weight of TiO$_2$ and 4.9 to 16.1% by weight of MgO said first mixture being fired at a temperature between 1300° to 1450° C. to result in a fired body, said fired body having a crystalline phase consisting essentially of said cordierite and said solid solution, said fired body having a coefficient of thermal expansion of not greater than 1.6×10$^{-6}$/°C. at a temperature of 40°-800° C.

2. A ceramic material as set forth in claim 1, wherein said first mixture is modified by adding thereto up to 5 parts by weight of SiC powder per 100 parts by weight of said modified first mixture.

3. A ceramic material as set forth in claim 1, wherein said ceramic powder mixed with the cordierite powder has a chemical composition consisting essentially of 1.0 to 20.0% by weight of SiO$_2$, 22.0 to 50.0% by weight of Al$_2$O$_3$, 1.0 to 20.0% by weight of Fe$_2$O$_3$, 19.0 to 59.5% by weight of TiO$_2$ and 1.2 to 20.0% by weight of MgO.

4. A ceramic material as set forth in claim 1, wherein said cordierite powder contains at least 90% by weight of cordierite crystals.

* * * * *